United States Patent [19]
Frommholz et al.

[11] Patent Number: 5,130,627
[45] Date of Patent: Jul. 14, 1992

[54] METHOD FOR POSITIONING A PART AND DEVICE FOR CARRYING OUT THE METHOD

[75] Inventors: Wilfried Frommholz, Soto de la Moraleja, Spain; Willi Hoppe, Achern-Oberachern; Klaus Vöhringer, Malsch, both of Fed. Rep. of Germany

[73] Assignee: Robert Bosch GmbH, Stuttgart, Fed. Rep. of Germany

[21] Appl. No.: 459,718

[22] PCT Filed: Aug. 19, 1988

[86] PCT No.: PCT/DE88/00509
§ 371 Date: Jan. 19, 1990
§ 102(e) Date: Jan. 19, 1990

[87] PCT Pub. No.: WO89/02112
PCT Pub. Date: Mar. 9, 1989

[30] Foreign Application Priority Data

Sep. 2, 1987 [DE] Fed. Rep. of Germany ...... 3729312

[51] Int. Cl.⁵ .................................. G05B 1/06
[52] U.S. Cl. .................................... 318/652; 318/663
[58] Field of Search .......... 318/293, 663, 256, 264, 318/265, 266, 267, 280, 282, 283, 285, 286, 466, 467, 468, 469, 652

[56] References Cited

U.S. PATENT DOCUMENTS

| | | | |
|---|---|---|---|
| 4,078,198 | 3/1978 | Murakosi et al. | 318/663 X |
| 4,388,571 | 6/1983 | Tada et al. | 318/293 |
| 4,401,929 | 8/1983 | Odaka et al. | 318/466 |
| 4,408,146 | 10/1983 | Beckerman | 318/264 |
| 4,429,264 | 1/1984 | Richmond | 318/466 |
| 4,481,452 | 11/1984 | Kitano et al. | 318/293 X |
| 4,514,666 | 4/1985 | Suzuki | 318/293 |
| 4,549,233 | 10/1985 | Teranishi et al. | 318/256 X |
| 4,591,773 | 5/1986 | Numata | 318/663 |
| 4,694,390 | 9/1987 | Lee | 364/510 X |
| 4,712,053 | 12/1987 | Numata | 318/663 |
| 4,713,591 | 12/1987 | McCloskey | 318/257 |
| 4,767,974 | 8/1988 | Kadosawa | 318/663 |
| 4,800,324 | 1/1989 | Kuttner | 318/293 |
| 4,931,714 | 6/1990 | Yamamoto | 318/663 |
| 4,983,892 | 1/1991 | Suga et al. | 318/98 |

Primary Examiner—Bentsu Ro
Attorney, Agent, or Firm—Michael J. Striker

[57] ABSTRACT

A method for positioning a part and a device for carrying out the method is proposed. The positioning device contains an electric motor (10) which is connected via a coupling (11) to the part (12) to be positioned and to an actual position value transmitter (13). The motor (10) can be connected to an energy source via a motor driver circuit (20) in dependence on the driver control signals (23, 24) generated by a control circuit (51). The control circuit (31) exhibits at least one control input (33, 34), to which a switch-off signal for the driver (20) or the motor (10), respectively, can be applied. The switch-off signal is generated by at least one comparator (43, 44) in dependence on the actual position value emitted by the actual position value transmitter (13). Two thresholds (46, 47) are preferably predetermined which correspond to the mechanical stops (14, 15) of the part (12) to be positioned. A time delay (48, 49) between when the stop (14, 15) is reached and the switch-off signal ensures that the part to be positioned is pressed against the stop (14, 15) with a certain pressure force.

7 Claims, 1 Drawing Sheet

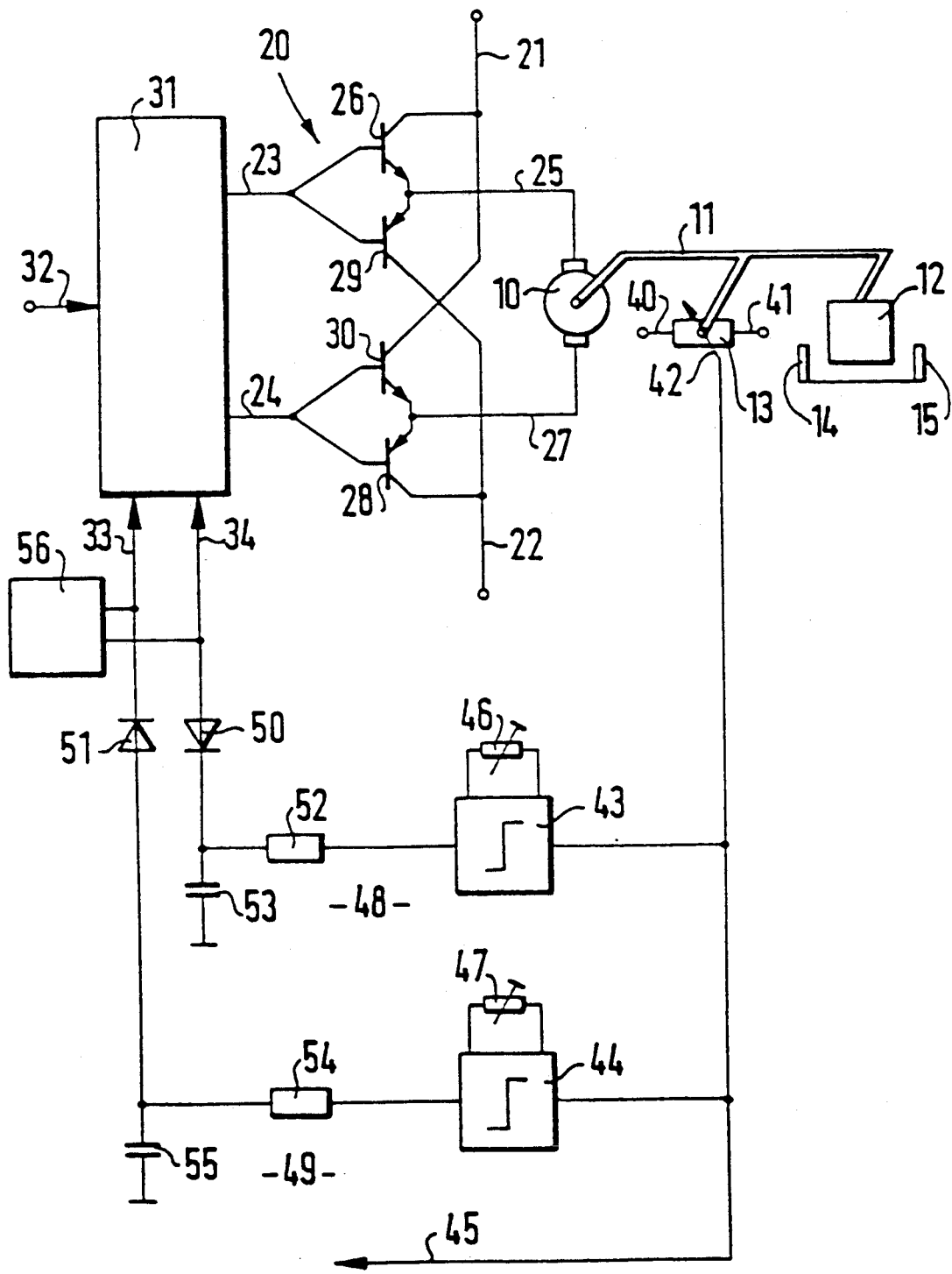

METHOD FOR POSITIONING A PART AND DEVICE FOR CARRYING OUT THE METHOD

BACKGROUND OF THE INVENTION

The invention relates to a method of positioning a part and on a device for carrying out the method wherein operation of an electric motor drive is controlled in accordance with a nominal position of the part. It is generally known prior art to detect mechanical end stops by limit switches in a positioning device. When a stop is reached, the positioning device or the part to be positioned actuates a limit switch which stops the positioning drive. The limit switches must be accurately aligned since a faulty end stop can result, on one hand, in damaging the positioning device and, on the other hand, in overloading the positioning drive.

An integrated circuit for pulse-duration-modulated driving of direct-current motors is known from the in-house document "Silicon general, linear integrated circuits, voltage regulator with applications", Product Selection, 1982/83, Messrs. Astonik, Winzererstr. 47d, 8000 Munich 40, pages 111-118. The circuit is suitable for driving positioning device drive motors. The electric motor, which can be switched on by a control circuit via a driver circuit, is connected via a coupling to a part to be positioned and to an actual position value transmitter. The electric motor is switched on in dependence on the difference between a nominal position value and the actual position value until the system deviation drops below an adjustable value. The control circuit exhibits a connection, designated by "shut down", via which the driver circuit or the electric motor, respectively, can be switched off.

SUMMARY OF THE INVENTION

The object of the invention is to provide part positioning method and device in which limit switches are not required for detecting the mechanical stops. The object of the invention is achieved by providing method and device wherein the signal generated by an actual position value transmitter is compared with a threshold value, and a switch-off signal is generated in response to the threshold value being exceeded. There is no cost-intensive alignment of the limit switches hitherto used. The drive circuit of the electric most or has a control input which is supplied with a signal in dependence on the actual position value emitted by the position transmitter. This signal can be used, for example, to switch the drive motor off at a predetermined actual position value or to change its direction of rotation.

It is particularly advantageous to supply the control input with a signal in dependence on at lest one predetermined position limit value. Both mechanical stops are detected by predetermining first and second position limit values. When a position limit value corresponding to the stop is reached, the drive motor is switched off. In a particularly advantageous development of the method according to the invention, it is provided to inhibit the driver circuit, or the drive motor, respectively, when a position limit value is reached, in such a manner that the direction of rotation of the motor for adjusting the position in the direction of the position limit value reached is inhibited and that the opposite direction is not inhibited, so that the position limit value that was reached can be reduced again in the opposite direction.

In the device according to the invention for carrying out the method, the actual position value signal emitted by the position transmitter is advantageously supplied to a comparator with a predetermined threshold, which emits a switch-off signal to the at least one control input of the control circuit when the threshold is exceeded. In a second embodiment of the device according to the invention, a comparator having first and second thresholds is provided which in each case emits a switch-off signal to the control circuit when the thresholds are exceeded or dropped below, respectively.

In the third embodiment, two separate comparators having thresholds which are in each case predetermined are provided, with each comparator emitting a switch-off signal to the control circuit by which one or the other direction of rotation of the electric motor is inhibited when the threshold is exceeded or dropped below, respectively.

BRIEF DESCRIPTION OF THE DRAWINGS

The single FIGURE of the drawings shows a circuit diagram of a positioning device according to the invention.

DETAILED DESCRIPTION OF THE PREFERRED EMBODIMENTS

In the FIGURE, 10 designates an electric motor which is connected via a coupling 11 to a part 12 to be positioned and to an actual position glue transmitter 13.

The part 12 to be positioned can be positioned between a first and second mechanical stop 14, 15. The electric motor 10 can be connected via a motor driver circuit 20 to the first and second connection 21, 22 of a voltage source, not shown. In dependence on the signals on the driver input lines 23, 24, either the first motor connection 25 can be connected to the first voltage source connection 21 via a first switch 26 and a second motor connection 27 can be connected via a second switch 28 to the second voltage source connection 22, or the first motor connection 25 can be connected via a third switch 29 to the second voltage source connection 22 and the second motor connection 27 can be connected via a fourth switch 30 to the first voltage source connection 21. The four switches 26, 28, 29, 30 are implemented, for example, as switching transistors. In the embodiment described, mutually complementary transistors are used, the driver circuit 20 being controllable via only two drier input lines 23, 24. In another embodiment not shown, the driver circuit 20 can be formed by four transistor 26, 28, 29, 30 of the same type of conductivity, four driver input lines being required.

The signals at the driver input lines 23, 24 are generated by a control circuit 31 which has at least one input lie 32 and first and second control inputs 33, 54. The control circuit 31 generates control pulses for the driver circuit 20 in dependence on the signal supplied via the input line 32. The input signal is, for example, a system deviation signal formed by the difference of the nominal position value and the actual position value.

The actual position value transmitter 13 is formed, for example, as potentiometer, the fixed connections 40, 41 of which are connected to a voltage source having a stabilized voltage. At the moving center tap 42 of the position transmitter 13, a voltage is available which represents a measure of the actual position value. The signal is supplied to a first and second comparator 43, 44 and, via the line 45, to circuit pats, not shown. Each of the comparators 43, 44 has a threshold which is predetermineable by adjusters 46, 47. When the threshold is exceeded, the comparators 44, 44 emit a signal to the first or second control lines 33, 34. A signal delay section 48, 49 is in each case arranged between the comparators 43, 44 and the control lines 33, 34. The signal delay sections 48, 49 are connected to the control lines 33, 34 via diodes 50, 51. The signal delay sections 48, 49 are formed, for example, as RC low-pass filters with resistors 52, 54 and capacitors 53, 55.

The control lines 33, 34 are connected to a visual and/or acoustical indicator 56, which indicates a signal on the control lines 33, 34.

The method according to the invention is explained in greater detail with reference to the circuit arrangement described.

The actual position value signal emitted by the position transmitter 13 is compared with predetermined thresholds in the comparators 43, 44. The thresholds are preferably selected in accordance with the position of mechanical stops 14, 15 for the part 12 to be positioned. If, for example, the first stop 14 is reached, the first comparator 43 provides a switch-off signal via the time delay section 48 and via the diode 50 to the input line 34 of the control circuit 31. In consequence, the direction of rotation of the electric motor 10 for adjusting the position of the part 12 in the direction of the first stop 14 is inhibited, whilst, however, it is still possible to switch the electric motor on in the opposite direction of rotation. The time delay section 48 ensures that the electric motor 10 is not immediately switched off after the first stop 14 is reached, but still keeps running for a predeterminable short time. In special applications, this results in the advantage that the part 12 to be positioned is pressed against the mechanical stop 14 with a certain force. The time delay section 48 can be omitted in special cases of application in which this pressure force is not required. The diode 50 ensures a decoupling between the signal present ion the control line 34 and the signal occurring at the delay section 48 if the switch off signal is not given. The switching threshold of the second comparator 44 is set in such a manner that a switch-off signal is emitted when the part 12 to be positioned reaches the second mechanical stop 15. Here, too, the time delay section 49 ensures a pressure force of the part 12 against the second stop 15.

It is desirable in particular cases of application to indicate visually and/or acoustically that one or both predetermined actual position values have been reached. For this purpose, the display 56 is provided which is connected to the control lines 33, 34. Reaching of a threshold or one of two thresholds can signal, for example, an error of the actual position value transmitter 13 or of the coupling 11.

In a further embodiment of the device according to the invention, only one comparator 43 or 44 with a predeterminable threshold is provided. This simpler embodiment is suitable for monitoring a predetermined position limit value for the part 12 to be positioned.

In a further embodiment, a comparator having two different predetermined thresholds, is provided instead of the two comparators 43, 44. In contrast to the embodiment comprising the two comparators 43, 44, the one comparator generates at only one output, when one of the two thresholds is exceeded, a switch-off signal which is supplied to the control circuit 31 via a control line 33 or 34. In the two embodiments of the device according to the invention in which one comparator is used, the electric motor is switched off when one of the predetermined thresholds is reached, and cannot be switched on again without intervention in the circuit. These simpler embodiments are therefore suitable for monitoring the performance of the position device according to the invention for errors, particularly in conjunction with the indicator 56.

The comparators 43, 44 and the time delay sections 48, 49 can be implemented both with analog and digital technology. In the latter case, the signal emitted by the actual position value transmitter 13 is supplied to an analog/digital converter, the output signal of which is compared in a digital computer circuit with predetermined values in the manner described and is emitted with a time delay to the control lines 33, 34 in dependence on the comparison operations.

While the invention has been illustrated and described as embodied in a method of and an apparatus for positioning a part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for positioning a part between opposite mechanical stops, said device comprising an electric motor rotatable in opposite directions for positioning the part against the opposite mechanical stops; a control circuit for controlling the operation of said electric motor in accordance with a predetermined nominal position value; at least one actual position value transmitter for generating an actual value position signal corresponding to the position of the part; and signal delay means arranged between said at least one actual position value transmitter and said control circuit, said signal delay means, in response to an actual position value signal generated when the part reaches one of said opposite mechanical stops, for allowing said control circuit to continue energizing said electric motor for the predetermined period of time, said control circuit stops the rotation of said electric motor after a predetermined period of time to move the positionable part against the one of the opposite mechanical stops with a certain pressure force.

2. A device as set forth in claim 1, further comprising a driver circuit for driving the rotation of said electric motor, said control circuit including an input connected with said signal delay means and an output connected with said driver circuit.

3. A device as set forth in claim 2, further comprising at least one comparator arranged between said actual position value transmitter and said signal delay means for comparing said actual value position signal with said predetermined nominal position value and for generating a comparison signal communicated to said input of said control circuit.

4. A device as set forth in claim 2, wherein said actual position value transmitter comprises a potentiometer.

5. A device as set forth in claim 2, wherein said signal delay means comprises a capacitance-resistance low-pass filter.

6. A device as set forth in claim 2, further comprising conductor means connecting said signal delay means with said input of said control circuit, and decoupling diode means arranged in said conductor means.

7. A device as set forth in claim 2, further comprising at least one of acoustic and visual display indicators connected with said input of said control circuit for indicating a signal applied to said input.

* * * * *